Nov. 17, 1942.　　　J. J. NEUMAN　　　2,302,137
PALLET AND LIFTING DEVICE THEREFOR
Filed May 22, 1940　　　2 Sheets-Sheet 1
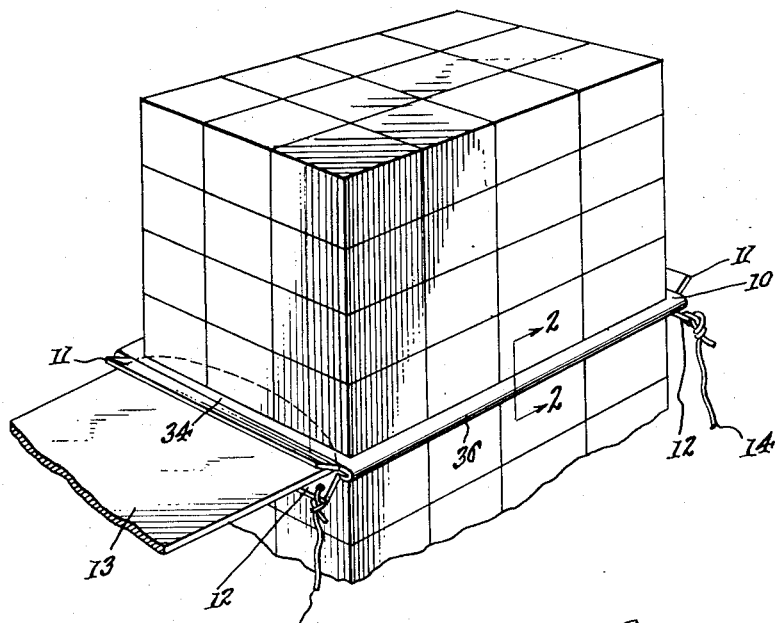
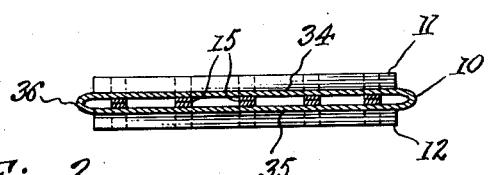
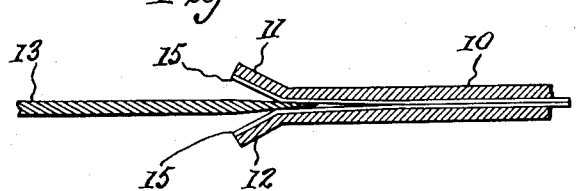
Inventor
J. J. Neuman
By
C. P. Goepel
Attorney Nov. 17, 1942.          J. J. NEUMAN          2,302,137
PALLET AND LIFTING DEVICE THEREFOR
Filed May 22, 1940          2 Sheets-Sheet 2
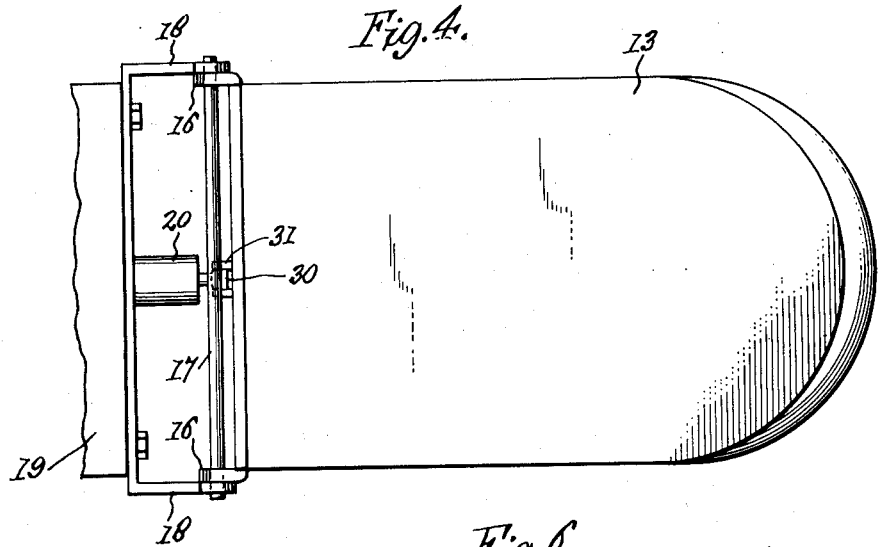
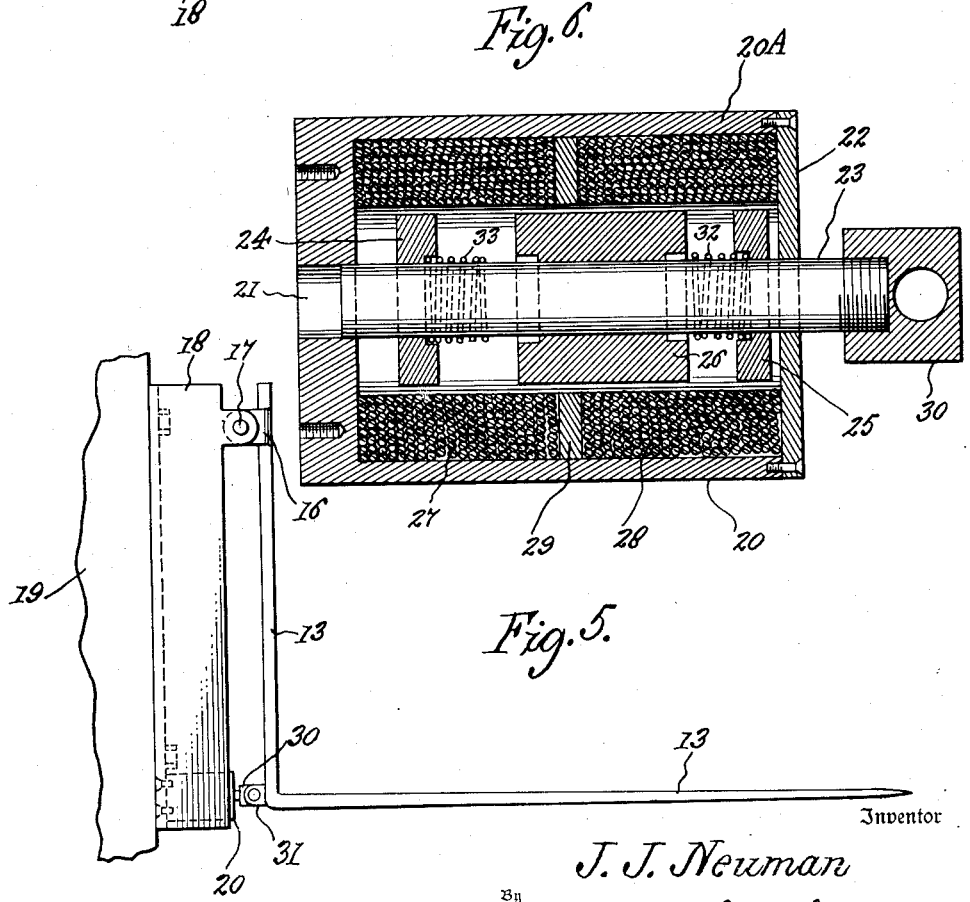
Inventor
J. J. Neuman
By
C. P. Goepel
Attorney Patented Nov. 17, 1942

2,302,137

UNITED STATES PATENT OFFICE 2,302,137

PALLET AND LIFTING DEVICE THEREFOR

Jacob J. Neuman, South Salem, N. Y., assignor to United States Patent Development and Royalty Company, South Salem, N. Y., a corporation of New York Application May 22, 1940, Serial No. 336,682

6 Claims. (Cl. 214—113)

The present invention relates to improvements in storage and shipping pallets and has for an object a throw-away pallet for pallet storage and shipping by railroad car and truck, which is inexpensive and may be thrown away after it is worn out or damaged.

At present, wooden pallets are used, which consist of two layers of boards spaced apart by several heavy wooden spacers to provide channels into which the forks of a lift truck may be freely inserted or withdrawn. Due to the necessity for sturdy construction to withstand constant use, such pallets are relatively expensive and even then are subject to considerable breakage and maintenance expense.

The conventional pallet system of handling and storage consists briefly of piling the articles of manufacture on the pallets which are then picked up by the fork truck and taken to the warehouse where they are stacked one on top of the other until time for shipment, when the fork truck again picks them up and takes them to the truck or railroad car. The articles are then manually removed from the pallets and again piled in the truck or freight car. This last stop consumes considerable time and labor. With the improved "throw-away pallet," the fork truck stacks the loaded pallets in the truck or freight car and they are shipped off with the rest of the load resulting in much faster loading and considerable savings.

It is, therefore, the primary object of this invention to provide a pallet the cost of which is low enough so that it may be used for the handling and storage of finished articles of manufacture prior to shipment and then be shipped off with its load in the railroad car or truck. The savings and advantages derived through the reduced handling costs and time saved in loading the cars and trucks by the "throw-away pallet system" more than equals the cost of the pallets and thus permits their use for a complete cycle of handling, storage and shipment.

A further object of the invention is to provide a special improved lift truck for use with the throw-away pallet.

A still further object is to provide the pallet with stabilizing means thus permitting higher stacking of pallets and more efficient use of storage space.

Another object is to provide a pallet which compared to the conventional wooden pallet is relatively flexible and thus better adapted to use with objects of irregular shape since this flexibility permits the bottom of the pallet to adjust itself to the irregularities of objects on pallets lower in the tier thereby distributing the load and providing the necessary stability.

Still another object is to provide a reciprocating means for inserting and withdrawing the pallet supporting means of the lift truck.

With the foregoing and other objects in view, the invention will be more fully described hereinafter, and will be more particularly pointed out in the claims appended hereto.

In the drawings wherein I have illustrated my invention.

Figure 1 is a perspective view of the throw-away pallet in use showing how the pallet supporting member of the lift truck is inserted.

Figure 2 is a transverse section of the pallet on the line 2—2 of Figure 1.

Figure 3 is a fragmentary enlarged transverse section of the pallet and pallet supporting member taken at right angles to Figure 2.

Figure 4 is a plan view of the pallet supporting member showing the method of attachment to the elevating carriage of the lift truck.

Figure 5 is a fragmentary side elevation of the same.

Figure 6 is a enlarged sectional view of the means for imparting a reciprocating motion to the pallet supporting member of the lift truck.

Referring to the drawings the pallet consists of an envelope or flattened tube 10 of fibre board open at both ends, the ends being flared apart to form lips 11 and 12. The envelope is lined with several longitudinally extending sheet metal strips 15 which extend the entire length of the pallet and to the edges of the lips 11 and 12 (best seen in Figures 2 and 3). These strips 15 serve to stiffen the pallet and provide a relatively non-friction metal to metal sliding contact with the pallet supporting member 13 of the lift truck.

The pallet supporting member of the lift truck consists of a steel plate 13 instead of the conventional forks. The end of the plate 13 is curved and sharpened and when it is desired to move the loaded pallet the plate 13 is inserted into the envelope 10 between the lips 11 and 12 which form a guiding means. Talc, graphite or other suitable lubricating means is used inside the envelope to aid easy insertion and withdrawal of the plate 13.

The lift truck end of the plate 13 is turned up at right angles and is provided with tabs 16 through which the supporting shaft 17 extends. The extremities of the shaft 17 are journalled in the member 18. The member 18 is adapted to be bolted or otherwise secured to the elevating carriage of the lift truck, indicated at 19, in the same manner as conventional forks.

Near the lower part of the member 18 and substantially in line with the horizontal portion of the plate 13 is the reciprocating means generally designated by the numeral 20. This may take the form of a mechanically actuated quick return mechanism, a pneumatic hammer or a magnetic hammer. Due to the difficulties of providing a mechanical drive on the moving elevating carriage 19 and the fact that an air compressor would be necessary for the pneumatic hammer, I prefer to employ a magnetic hammer which since electric power is already available on the lift truck is best adapted.

Referring to Figure 6 this consists of a frame 20A of magnetic material adapted to be bolted to the member 18. The frame 20A has a central hole 21 in one end and the end plate 22 is provided with a similar hole. The core 23 is adapted to slide longitudinally back and forth in these holes. Rigidly secured to the core 23, as by pinning, welding or formed as part of the core, are the washer-like members 24 and 25. The members 24 and 25 are so placed relative to the end of the frame 20A and the end plate 22 that limited movement of the core 23 is permitted. Loosely sliding on the core 23 and positioned between the members 24 and 25 is the hammer member 26 which like the frame end core 23 is formed of magnetic material. Separate windings 27 and 28 are provided in each end of the core and separated by the washer 29 of magnetic material.

The end of the core 23 has the journal block 30 secured thereto and adapted to be pinned to the lugs 31 of the plate 13.

Referring again to Figure 1, the corners of the lips 12 are provided with rope ties 14 for tying adjacent tiers of pallets together in the warehouse. This provides an effective means of stabilizing the stacks of pallets when they are piled high. These ties 14 may also be used to anchor the pallet when inserting or withdrawing the plate 13 in the case where the reciprocating means 20 is not employed as in the case of relatively light loads.

It will be appreciated that, when the pallet is fully loaded with heavy articles, in spite of the metal strips 15 and any lubricating means in the pallet, the starting friction of first inserting or withdrawing the plate 13 will be high. It was found that in some cases the pallet was merely pushed or pulled along the floor or off of the pallet beneath and the plate could not be inserted or withdrawn. This difficulty is overcome by the use of the reciprocating device 20 which inserts the plate 13 or withdraws it with a series of quick hammer blows which overcome the starting friction between the plate 13 and the pallet by utilizing the inertia of the loaded pallet.

In operation, on insertion of the plate 13 the winding 28 is rapidly energized and deenergized by any suitable make and break device (not shown) in its circuit. When the winding 28 is energized the hammer member 26 is drawn forcibly to the right and strikes the member 25 with a sharp blow thus driving the plate 13 a short distance into the pallet. At the same time the truck is moving slowly forward thus moving the core 23 back to the left. When the winding 28 is deenergized the hammer member 26 is pushed back away from the member 25 by the compression spring 32 ready for the next blow. On withdrawal of the plate 13 the winding 27 is used and the operation is reversed. A spring 33 resets the hammer 26 after each blow in the same manner as the spring 32.

In addition to the previously noted advantages, the use of the "throw-away pallet" eliminates the cost of maintenance and repairs experienced with conventional pallets. Due to the "throw-away pallet" being relatively thin, the height of piles in the warehouse is somewhat lessened providing greater stability. The "throw-away pallet" is relatively light in weight facilitating ease and speed of handling of the empties. Savings are realized due to the elimination of dunnage boards in the freight cars as the pallets themselves act as dunnage.

The upper wall 34 of the flexible pallet is connected with the lower wall 35 thereof by the end connecting walls or side member 36. Of course it is not essential that the walls 34 and 35 shall be formed out of a tube. This is merely one convenient method of forming a pallet in accordance with the present invention. It is sufficient that there be separable walls 34 and 35 which will move apart when the lifting member 13 is inserted in the space between these members 34 and 35. In other words the members 34 and 35 are adapted to move apart to provide a space in which to receive the lifting member 13. It is preferable to have a unitary construction of the pallet and for this reason some connecting means 36 between the plates 34 and 35 may be used.

The pallet member will preferably be wider or longer, or greater in one horizontal dimension than the similar dimension of the stack of articles supported on the pallet so as to leave a projecting part to which the rope tie or other connection 14 may be attached. It is also desirable to have the pallet of sufficient length so that the lips 11 and 12 will not receive the weight of the articles and will therefore be beyond the vertical line which coincides with the side walls of the stacks of the articles.

It is obvious that various changes and modifications may be made in the details of construction and design of the above specifically described embodiment of this invention without departing from the spirit thereof, such changes and modifications being restricted only by the scope of the following claims.

What is claimed is:

1. An improved pallet and lifting device comprising a pallet having a space therein, a lifting member constructed and arranged to removably enter said space, and means to vibrate said lifting member to facilitate its entrance into said space.

2. An improved pallet and lifting device comprising a pallet having a space therein, a lifting member so constructed and arranged as to removably enter said space, a movable truck on which said lifting member is movably hung, and a motor member supported by said truck and so related to said lifting member as to cause the lifting member to be vibrated to facilitate its entrance into said space of the pallet.

3. An improved pallet and lifting device comprising a pallet having a space therein, a lifting plate having an end constructed and arranged to facilitate the entry of the plate into said space, a truck on which said plate is pivotally hung, and a magnetic hammer on said truck coupled to vibrate said plate to facilitate its entrance into said space of the pallet.

4. An improved pallet and lifting device comprising a pallet having a space therein, a lifting plate so constructed and arranged as to removably enter said space, a vertical handling member for carrying said pallet, a pivot for hanging the upper end of said vertical member, a truck carrying said pivot, and a magnetic hammer carried by said truck and in substantial alinement with the plane of said plate and coupled to vibrate said plate.

5. A load handling device comprising a relatively thin pallet formed with load supporting walls disposed in face to face relationship, a lift truck having a vertically adjustable lifting member insertable between said load supporting walls, the inner faces of said load supporting walls offering frictional resistance to the entry of said lifting member therebetween and adapted to be spread apart upon entry of said lifting member. and means for imparting a force to said lifting member sufficient to overcome such frictional resistance to facilitate insertion of said lifting member between said load supporting walls and removal of said lifting member from said pallet.

6. A load handling device comprising a relatively thin pallet formed with load supporting walls disposed in face to face relationship, a lift truck having a vertically adjustable lifting member insertable between said load supporting walls with a wedging action, friction reducing means on the inner faces of said load supporting walls, and means for imparting a force to said lifting member sufficient to overcome friction between said lifting member and said pallet to permit insertion of said lifting member into and removal thereof from said pallet.

JACOB J. NEUMAN.